Patented July 8, 1952

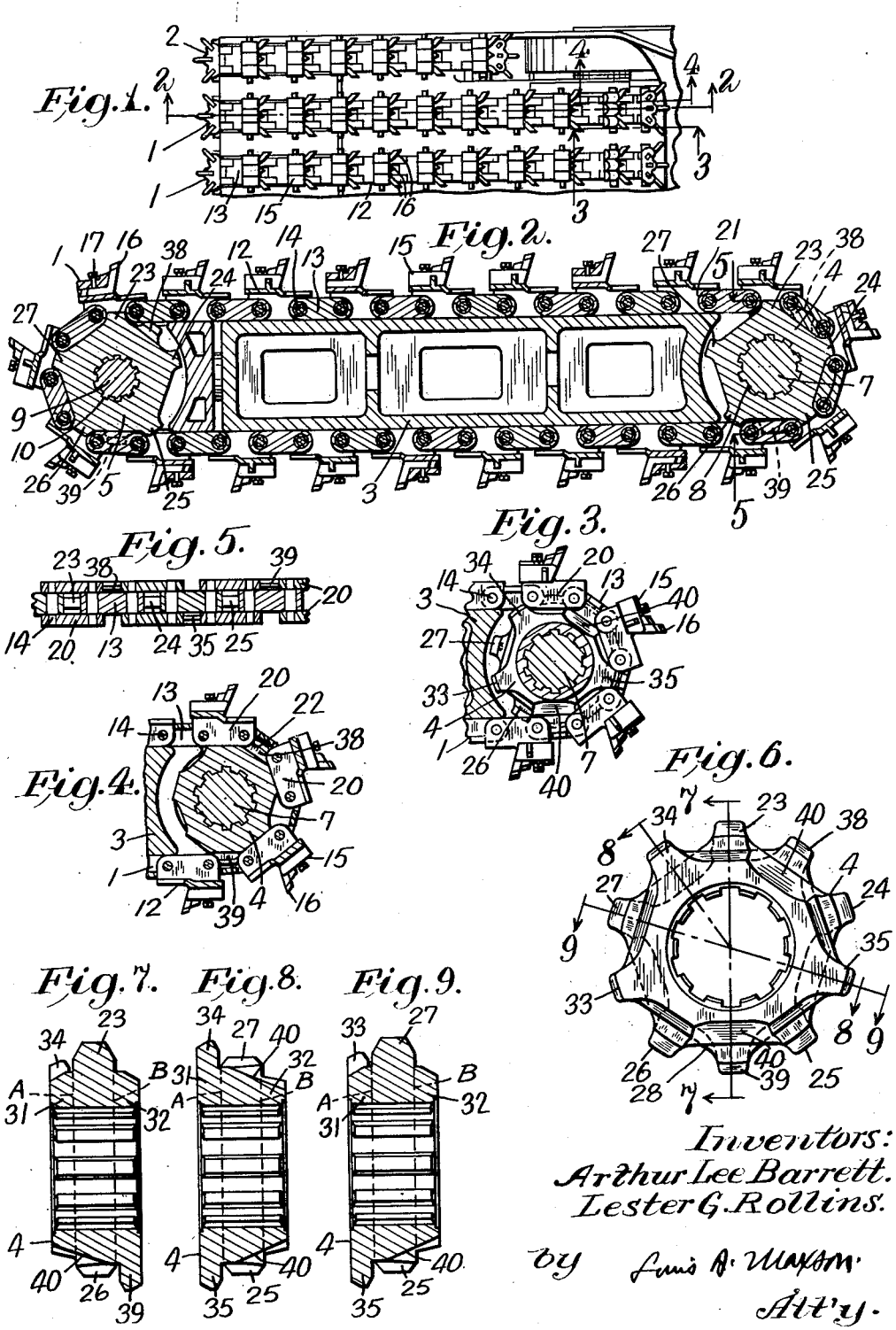

2,602,343

UNITED STATES PATENT OFFICE 2,602,343

CHAIN DRIVE

Arthur Lee Barrett and Lester G. Rollins, Franklin, Pa., assignors to Joy Manufacturing Company, Pittsburgh, Pa., a corporation of Pennsylvania Application November 26, 1949, Serial No. 129,658

10 Claims. (Cl. 74—243)

Our invention relates to chain driving means, and particularly, though not at all exclusively, to driving means particularly suited to the driving of chains constituting the material-attacking, disintegrating and moving instrumentalities of mineral vein attacking, disintegrating and loading out apparatus known as continuous miners.

In continuous miners it is a favored practice to employ as the mineral-attacking and disintegrating instrumentalities, chains comprising bit-carrying blocks and intermediate connecting links, pivotally connected together, and to arm the blocks with a plurality of bits—frequently as many as three per block; and, where a plurality of chains are used, and drive of a short chain is from a long chain which needs to be driven with sufficient power both to drag its own bits through the mineral and to effect drive of the shorter chain, special arrangements are requisite to avoid breakage or overstressing of the parts. Assuming that the connecting links were arranged midway between the sides of the bit-carrying blocks, and that the latter were appropriately formed to enable the cooperation with their ends of side sprockets, while a central sprocket imparted chain-circulating forces to the ends of the connecting links, there would, with such a compound sprocket, so long as the chain ran idly—i. e. not in contact with the mineral, be a very smooth and powerful drive, but when such a drive was attempted with the chain or chains moving through the mineral an entirely different story would result, for the teeth of the side sprockets would form side pocket walls and the teeth of the center sprocket would form end pocket walls, and the resultant pockets would pack with mineral particles and fragments and it would almost at once become impossible for the chain blocks to move radially inward of the compound sprocket and have proper driving relation to the sprocket structure. We have found that by employing as it were mutilated side sprockets and a complete circumferential row of central teeth, and not only cutting away completely one side sprocket tooth following each central sprocket tooth, but also cutting away obliquely a portion of the sprocket member from points near the bases of the remaining side teeth to points actually further inward than the cylindrical surface of the diameter of the base circle of the central sprocket, a truly self-cleaning chain driving sprocket may be produced, and still impart a greatly increased driving force to the chains. If the central sprocket have an even number of teeth, then each side sprocket can be made with just half as many teeth, with the teeth of the side sprockets alternating regularly, but if the central sprocket has an uneven number of teeth then at one sector of the sprocket there must be two consecutive teeth on the same side sprocket portion which will follow immediately consecutive central sprocket teeth.

It is an object of our invention to provide an improved chain-driving sprocket. It is another object to provide an improved self-cleaning chain driving sprocket having an improved arrangement of parts whereby a central row of sprocket teeth may drive a chain along the central zone thereof while interrupted rows of side teeth may cumulatively effect the transmission of an equal number of driving thrusts or forces to laterally disposed chain surfaces while yet having spaces provided for the escape from ahead of each central tooth of any material which might prevent proper cooperation of the sprocket with the chain. Other objects and advantages of the invention will hereinafter appear.

In the accompanying drawings, in which for purposes of illustration we have shown one form which our invention may assume in practice:

Figure 1 is a fragmentary plan view of a disintegrating apparatus of a type which is employed in a continuous miner.

Figure 2 is an enlarged longitudinal vertical section, on the plane of the line 2—2 of Figure 1, showing a disintegrating bar, a drive sprocket at one end thereof, a guide sprocket (also performing a shaft-driving function) at the other end thereof driven by the chain which the first sprocket actuates, and a closed chain loop extending around the sprockets.

Figure 3 is a similarly enlarged fragmentary sectional view on the plane of the line 3—3 of Figure 1.

Figure 4 is a similarly enlarged fragmentary sectional view on the plane of the line 4—4 of Figure 1.

Figure 5 is a developed view on the section lines 5—5 of Figure 2.

Figure 6 is a side elevational view on an enlarged scale of one of the sprockets illustrated in Figure 2.

Figures 7, 8, and 9 are diametric sectional views on the several planes 7—7, 8—8, and 9—9 of Figure 6 through the sprocket shown in that figure.

The disintegrating mechanism of a continuous miner, as illustrated in Figure 1, may comprise a plurality of relatively long disintegrating chains 1, 1, there being two, three, four or more of these depending upon the overall width desired for the disintegrating apparatus. The disintegrating apparatus may also comprise shorter side chains when desired, and one of these short side chains is shown at 2, and there would naturally be one corresponding to it at the opposite side of the disintegrating mechanism. It is, of course, unnecessary to use these short chains, and all of the chains may be of the full length type if desired. The long chains extend around boxlike frames 3 which are swingable about a horizontal axis at one end thereof. The long chains 1 are driven by drive sprockets 4 at the pivoted end of the disintegrating apparatus and coaxial with the axis of pivoting, and these chains are guided about corresponding sprockets 5. The short side chains are guided by corresponding sprockets being driven by sprockets coaxial with the sprockets 5 and guided at their rear ends by other sprockets, but, as it is unnecessary to illustrate, for a clear comprehension of the invention, the drive and guide sprockets of the short chains, these are not shown. The drive sprockets 4 are mounted on a splined shaft 7 with which they have splined engagement as at 8, and the guide sprockets 5 are mounted on another transverse shaft 9 with which they have splined engagement at 10. The journaling of these shafts and the drive of the shaft 7 are not shown, forming in detail no part of the present invention.

The chains, both 1 and 2, are made up of cutter bit-carrying blocks 12 and connecting links 13, the blocks 12 and connecting links 13 being pivotally connected with each other by pins or pintles 14. The blocks 12 have upstanding lugs 15 in which appropriate bits 16 are secured by set screws 17. It will be noted that there are a plurality, herein three, bits shown on each of the bit blocks 12. The bit blocks include not only the lug portions but also side portions. See Figures 3, 4 and 5 where these side portions are designated 20. The ends of the connecting links 13 are rounded as at 21 for cooperation with centrally disposed teeth on the drive sprockets and guide sprockets, and the ends of the side portions 20 are also rounded as at 22 in order that other, lateral, teeth carried on the drive and guide sprockets may cooperate with and impart driving forces to the rearward ends of the side portions 20 of the bit carrying blocks.

It is unnecessary, as above noted, to illustrate the supporting and journalling means for the shafts 7 and 9 or the means for driving the shaft 7, as such means are well known and in detail form no part of the present invention.

The structure of the sprockets 4 and 5 is essentially the same and this structure may assume various forms, for example it being possible to provide sprockets with even numbers of teeth, or sprockets with odd numbers of teeth, in their central series.

As illustrated, and noting particularly now Figures 6, 7, 8, and 9, the sprocket 4 comprises a central portion indicated as lying between parallel planes represented by the dotted lines A and B on Figures 7, 8 and 9, such planes being perpendicular to the axis of rotation of the sprocket. This central portion is, as shown, in the general form of a five-toothed sprocket, and carries sprocket teeth which are numbered, for purposes of reference, 23, 24, 25, 26, and 27. Between each consecutive pair of sprocket teeth 23, 24, 25, 26, and 27 there is a recess, these recesses being indicated by the reference character 28. These are not, as will later appear, purely flat bottomed recesses, corresponding generally with the sides of a pentagon.

Between the central portion of the sprocket, bounded by the planes A, B, and the sides of the sprocket, there are other sprocket portions, which are designated 31 and 32. These portions constitute mutilated sprockets, the portion 31, lying between the plane A and the adjacent side of the sprocket 4, having three sprocket teeth; and these three teeth are designated 33, 34 and 35. Between the plane B and the side at which the sprocket 32 is disposed there is a mutilated sprocket having but two teeth, these teeth being designated 38 and 39. It will be appreciated that, in order around the sprocket, the teeth 34, 38, 35, 39 and 33 provide at one side or the other of the central sprocket portion intermediate teeth. These intermediate teeth are in the same planes with the side plates 20 of the blocks 12 and each engages in turn an end of one of the side plates as the sprocket rotates. It will be noted that the teeth 34, 35 and 33 are arranged at certain of the corners of a pentagon, and that the teeth 34 and 33 come one right after the other at one side of the triple sprocket structure. Accordingly, assuming clockwise rotation of the sprocket structure in Figure 6, the tooth 34 will engage one rounded end of a side plate 20, and then, following the engagement of the sprocket tooth 27 in the central unbroken series with the end of a connecting link 13, there will be another longitudinal thrust imparted by the tooth 33, at the same side with the tooth 34 of the composite sprocket, to another side plate 20 on a different bit carrying lug 12. With this exception the sprocket teeth on the opposite sides of the central series alternate in their imparting of thrusts to the chain through engagement with the ends of the side plates 20 of the bit-carrying blocks 12. It will be obvious that if there were provided a six-tooth sprocket, then three teeth at either side of the central series of six could be employed, and these would alternate, and there would therefore be a uniform number of thrusts imparted to the chain by the side teeth. The cumulative number of thrusts imparted by the two sets of side teeth equals the number of thrusts imparted to the chain by the central series of teeth.

Now, if it were not for the fact that the side teeth were removed, now at one side and now at the other, where they come between the teeth of the central sprocket portion, the chain would become plugged with material, and effective drive would be impossible. However, by omitting a tooth at one side or the other, back of each of the central series of teeth, there is avoided this danger of packing of the sprocket, and this avoidance is made the more certain since the surfaces peripherally of the sprocket 4 are cut away obliquely, as at 40, at a fairly sharp angle and for more than two-thirds, with the proportions shown, of the full width of the sprocket. These cut away surfaces 40 extend from close to the root of each side sprocket tooth completely to the opposite side of the sprocket. Thus the chain blocks and the connecting links may force out laterally, at one side or the other of the sprockets, any material which may tend to get caught or trapped between the chain and the spaces intermediate the sprocket teeth 23, 24, 25, 26, and 27. Yet the power transmissible by the sprocket is considerably greater than could be transmitted by the central series of teeth alone, and there is provided a relatively uniform driving force, even by the side teeth, because the central teeth at all times guide and drive and center the chains with respect to the sprockets.

As a result of this invention it will be appreciated that the chain-rotative or circulating forces imparted to the chains by the central series of sprocket teeth are augmented very materially by the action of the side teeth, and that there is avoided any possibility, such as would certainly exist if complete series of teeth equal in number to the teeth in the central series were provided at both sides of such central series, of plugging of the sprocket with the mineral fragments and dust. Moreover, with an odd number of teeth on the central sprockets nearly uniform drive will be provided by the side teeth, and uniform drive if the central sprockets have an even number of teeth and the side sprockets have, as would then be the case, the same number of teeth on each of them.

While there is in this application specifically described one form which the invention may assume in practice, it will be understood that this form of the same is shown for purposes of illustration and that the invention may be modified and embodied in various other forms without departing from its spirit or the scope of the appended claims.

What we claim and desire to secure by Letters Patent is:

1. A chain driving sprocket including a central series of teeth and at opposite sides of said central series of teeth lateral teeth, the total number of lateral teeth being equal to the number of central teeth, there being one lateral tooth intermediate each pair of central teeth.

2. A chain driving sprocket including a central series of teeth and at opposite sides of said central series of teeth, lateral teeth, the total number of lateral teeth being equal to the number of central teeth, there being one lateral tooth intermediate each pair of central teeth, and the locations of said lateral teeth being such that at least at most places circumferentially of the sprocket there is alternation of teeth in the two opposite lateral series.

3. In a chain driving sprocket for driving a chain consisting of blocks having side portions spaced apart laterally and pivotally connected to intermediate connecting links, a sprocket having a central series of teeth for engaging and driving the ends of the connecting links and side teeth for engaging and driving the ends of the side portions of said bocks, there being but one side tooth in contact with a given end of a block at a time, and the sprocket being cut away peripherally obliquely to a point radially to the inside of the root circle of the teeth of the central series and at the opposite side of the sprocket.

4. In a chain driving sprocket for driving a chain consisting of blocks having side portions spaced apart laterally and pivotally connected to intermediate connecting links, a sprocket having a central series of teeth for engaging and driving the ends of the connecting links and side teeth for engaging and driving the ends of the side portions of said blocks, there being but one side tooth in contact with a given end of a block at a time, and the sprocket being cut away peripherally, from adjacent the inner side of each side tooth, obliquely to a point radially to the inside of the root circle of the teeth of the central series and at the opposite side of the sprocket.

5. In combination, a chain including blocks having side portions and connecting links disposed at their ends between the side portions of adjacent blocks and pivotally connected to such blocks, and a drive sprocket including teeth in one series engaging the rearward ends of each connecting link for imparting thrust thereto, and lateral series of teeth for contacting the rearward ends of the side portions of said blocks, at least most of the teeth of said lateral series alternating, from one lateral series to the other, in their contact with the rear edges of said side portions.

6. In a multiple sprocket, a body having centrally thereof a series of sprocket teeth disposed at the angles of a polygon, said body having at each side of said central series of teeth laterally disposed teeth, there being of said laterally disposed teeth cumulatively the same number as there are teeth in the central series, there being but one lateral tooth between successive teeth of the central series and the spaces between said teeth of said central series having inclined bottoms sloping away from the side teeth which lie circumferentially between said central teeth.

7. A chain driving sprocket including five teeth arranged at equal intervals about the periphery thereof and midway between the sides thereof, said sprocket further including at one of the opposite sides of said central series two teeth and three teeth at the other of the opposite sides of said central series, there being one side tooth midway between each pair of teeth of the central series and the side teeth at the opposite sides of said central series alternating with each other around said sprocket except where the extra tooth at one side necessitates the occurrence of two teeth at that side consecutively.

8. A chain driving sprocket as defined in claim 7 having the peripheral portions thereof alongside each side tooth sloping inwardly towards the opposite side of the sprocket to provide for the ready discharge of dirt from the spaces immediately between the preceding and following central teeth.

9. In combination, a chain comprising bit blocks and connecting links, and providing surfaces facing rearwardly with respect to the direction of chain circulation, including alternately, lengthwise of said chain, centrally arranged surfaces and pairs of oppositely laterally disposed surfaces, centrally arranged surfaces and pairs of oppositely laterally disposed surfaces alternating with each other along said chain, and a sprocket having teeth thereon for engaging each of said centrally arranged surfaces and other teeth thereon at opposite sides of said first mentioned teeth for engaging only one at a time of each pair of oppositely laterally disposed surfaces.

10. In combination, a chain comprising bit blocks and connecting links, and providing surfaces facing rearwardly with respect to the direction of chain circulation, including alternately, lengthwise of said chain, centrally arranged surfaces and pairs of oppositely laterally disposed surfaces, centrally arranged surfaces and pairs of oppositely laterally disposed surfaces alternating with each other along said chain, and a sprocket having teeth thereon for engaging each of said centrally arranged surfaces and other teeth thereon for engaging only one at a time of each pair of oppositely laterally disposed surfaces, the periphery of the sprocket being cut away transversely, obliquely inwardly, from adjacent the inner ends of said last mentioned teeth to the respectively opposite sides of said sprocket.

ARTHUR LEE BARRETT.
LESTER G. ROLLINS.

REFERENCES CITED

The following references are of record in the file of this patent:

UNITED STATES PATENTS

| Number | Name | Date |
|---|---|---|
| 1,201,813 | Luce | Oct. 7, 1916 |
| 2,334,813 | Doberstein | Nov. 23, 1943 |

FOREIGN PATENTS

| Number | Country | Date |
|---|---|---|
| 675,015 | France | Oct. 28, 1929 |